(No Model.)
J. W. B. COOK.
NUT LOCK.
No. 534,201. Patented Feb. 12, 1895.
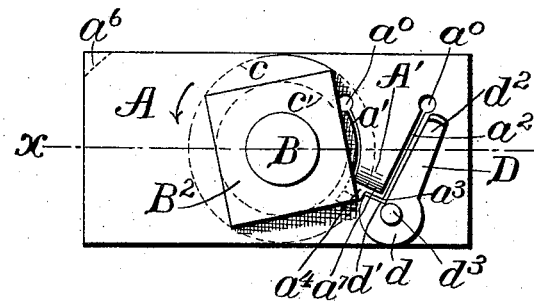
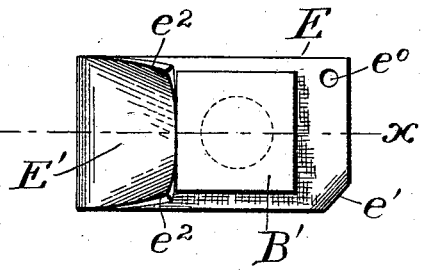
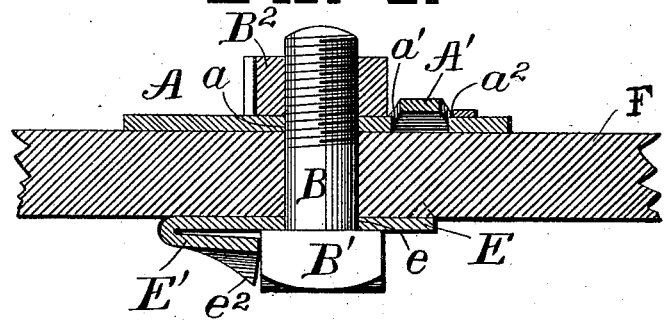
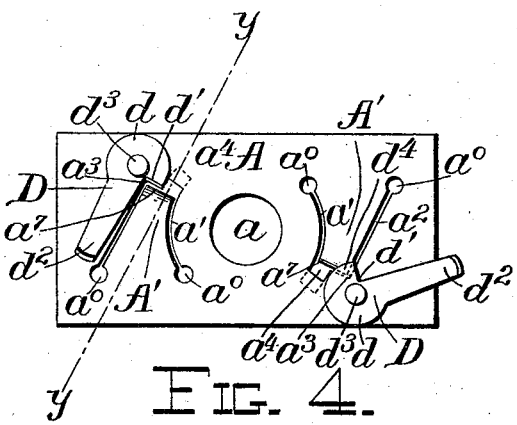
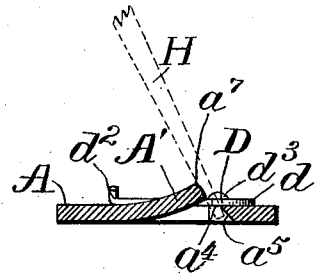
Witnesses
Percy C. Bowen
J. C. Wilson
Inventor
John W. B. Cook,
By Whitman & Wilkinson
Attorneys.
THE NORRIS PETERS CO., PHOTO-LITHO., WASHINGTON, D. C.

UNITED STATES PATENT OFFICE.

JOHN W. B. COOK, OF CAMDEN, ARKANSAS.

NUT-LOCK.

SPECIFICATION forming part of Letters Patent No. 534,201, dated February 12, 1895.

Application filed August 11, 1894. Serial No. 520,072. (No model.)

*To all whom it may concern:*

Be it known that I, JOHN W. B. COOK, a citizen of the United States, residing at Camden, in the county of Ouachita and State of Arkansas, have invented certain new and useful Improvements in Nut-Locks; and I do hereby declare the following to be a full, clear, and exact description of the invention, such as will enable others skilled in the art to which it appertains to make and use the same.

My invention relates to improvements in nut locks, and it consists in certain novel means for locking the nut in position on the bolt, and for facilitating the removal of the same when desired.

Reference is had to the accompanying drawings, in which the same parts are indicated by the same letters throughout the several views.

Figure 1 represents a plan view of one of the improved nut locks in operative position upon the bolt showing the nut in the locked position, and Fig. 2 is a similar view of one of the locks for the head of the bolt. Fig. 3 represents a sectional view on the line $x\ x$ of Figs. 1 and 2. Fig. 4 represents a plan view of one of the nut locks formed with two locking devices, one of which is shown in its unlocked position. Fig. 5 represents a sectional view on the line $y\ y$ of Fig. 4.

In Fig. 1 is illustrated the device for locking the nut to prevent the same from turning upon the bolt and in Fig. 2 is illustrated the device for locking the head of the bolt to prevent the bolt from turning. The former consists of a plate A formed of resilient metal and perforated at its center as at $a$ to receive the bolt. A curved slot $a'$ is formed in the plate A concentric with the opening $a$, and at a distance therefrom less than the radius of the circle $c$ described by the corners of the nut when turned upon the bolt, and greater than the radius of the circle $c'$ inscribed within the nut. Another slot $a^2$ is formed in the plate converging toward the slot $a'$ to a point $a^3$ from which point the plate is cut across to the slot $a'$ leaving a tongue A'. This tongue A' is bent upwardly as shown in Fig. 5 so that its free end will be normally above the plate A.

A latch D having an enlarged circular head $d$ cut away as at $d'$, and a lever arm $d^2$, is pivoted as at $d^3$ near the free end of the tongue A' in such a position that when the lever arm $d^2$ is parallel with the slot $a^2$ the free end of the tongue A' will be free to spring up as shown in Figs. 1 and 5. When the tongue A' is pressed down into the slot in the plate, the lever arm $d^2$ may be turned to bring the head $d$ over the end of the tongue (as shown at $d^4$ in Fig. 4), and hold the said tongue down so that the nut may be freely turned in either direction.

A round hole $a^0$ is formed at the beginning of each of the slots $a'$ and $a^2$ to prevent the metal from cracking or splitting, and an opening $a^4$ is formed at the opposite end of the slot beyond the end of the tongue A' having its end undercut or inclined as at $a^5$, (in Fig. 5,) for a purpose to be hereinafter explained.

In Fig. 2 is illustrated a device for holding the bolt from turning, consisting of a plate E perforated to receive the bolt as at $e$, and bent over upon itself as at E'. A hole $e^0$ may be made in the said plate through which a nail may be driven to hold the said plate from turning, or the corner of the plate may be bent down as at $e'$ and driven into the wood or in an indentation in the metal as the case may be. The corners of the leaf E' are preferably turned up as at $e^2$ to guide the head of the bolt to its seat.

In operation the bolt B is passed through the plate E (and the pieces F to be secured by the bolt) so that its head B' will rest upon the said plate with one of its straight sides against the leaf E'. The plate A is then passed over the end of the bolt and the nut B² placed on and screwed down, the latch D being in the open position shown in Fig. 1. As the nut is turned the corners passing round the circle $c$ in the direction of the arrow will press the tongue A' down as they pass over it and the said tongue will spring up behind each corner thereby preventing the nut from being turned back. When it is necessary to remove the nut, the latter may be turned in the direction of the arrow until the tongue A' is pressed down far enough to allow the latch D to be turned to bring its round head $d$ over the corner of the tongue which will hold the latter down and allow the nut to be unscrewed.

Should the nut in its locked position be so tight as to render it impossible to turn it far enough to pass the tongue down, a nail, or other lever, may be inserted in the opening $a^4$ and pressed under the inclined side $a^5$ (as shown in dotted lines at H in Fig. 5) and by forcing the free end of the lever H down toward the plate the tongue may be forced down and locked, as will be readily understood. The upper edge of the end of the tongue A' is rounded or beveled as at $a^7$ to facilitate the operation of latching it, and of removing the bolt.

The plate A may be held in position by placing one of its straight sides against some projecting part of the piece to be secured, by driving a nail through one of the holes $a^0$ or against one of its straight sides, or one of its corners may be bent down as shown by the dotted line $a^6$.

In Fig. 4 I have shown a plate A having two tongues A' and two latches D, and it will be obvious that other slight modifications might be made in either of the plates without departing from the spirit of the invention.

Having thus described my invention, what I claim, and desire to secure by Letters Patent of the United States, is—

1. In a nut lock the combination with a plate perforated to receive the bolt, and having tongues projecting above said plate to engage the corners of a nut, of latches pivoted near the ends of the said tongues in position to be turned over the tongues to hold the latter down, substantially as described.

2. In a nut lock the combination with a plate perforated to receive the bolt, and having tongues projecting above said plate to engage the corners of the nut, latches pivoted on the said plate to pass over the said tongues and hold the same down out of engagement with the nuts, of a plate perforated to receive the bolt and turned over upon itself to engage the head of the bolt and prevent the latter from turning, and means for securing the said plates from turning, substantially as described.

3. In a nut lock the combination with a plate perforated to receive the bolt, and having tongues projecting above said plate to engage the corners of a nut, and an opening having an under-cut edge in which a lever may be inserted to force the said tongues down, of latches pivoted near the ends of the said tongues in position to be turned over the tongues to hold the latter down, substantially as described.

In testimony whereof I affix my signature in presence of two witnesses.

JOHN W. B. COOK.

Witnesses:
E. B. CAWTHON,
J. B. WINFREY.